(12) United States Patent
Kosakai

(10) Patent No.: US 7,750,946 B2
(45) Date of Patent: Jul. 6, 2010

(54) SIGNAL PROCESSING APPARATUS ALLOWING AN INCREASE IN PIXELS WITHOUT AN INCREASE IN DRIVING FREQUENCY AND CIRCUIT AREA

(75) Inventor: Ryota Kosakai, Tokyo (JP)

(73) Assignee: Sony Corporation, Tokyo (JP)

( * ) Notice: Subject to any disclaimer, the term of this patent is extended or adjusted under 35 U.S.C. 154(b) by 468 days.

(21) Appl. No.: 11/608,401

(22) Filed: Dec. 8, 2006

(65) Prior Publication Data
US 2007/0146495 A1 Jun. 28, 2007

(30) Foreign Application Priority Data
Dec. 26, 2005 (JP) .............................. 2005-372790

(51) Int. Cl.
H04N 5/228 (2006.01)
G06K 9/32 (2006.01)
(52) U.S. Cl. .................................. 348/222.1; 382/298
(58) Field of Classification Search ............. 348/222.1; 382/298, 299
See application file for complete search history.

(56) References Cited

U.S. PATENT DOCUMENTS 5,748,235 A * 5/1998 Kondo et al. ............. 348/222.1

| | | | |
|---|---|---|---|
| 6,356,306 B1 * | 3/2002 | Kobayashi | 348/322 |
| 6,674,464 B1 * | 1/2004 | Mizutani et al. | 348/222.1 |
| 6,940,550 B2 * | 9/2005 | Kitawaki et al. | 348/246 |
| 7,321,685 B2 * | 1/2008 | Okada et al. | 382/167 |
| 7,424,207 B2 * | 9/2008 | Nishikawa et al. | 386/124 |

FOREIGN PATENT DOCUMENTS

JP 11185031 A * 7/1999
JP 2000-92376 3/2000

* cited by examiner

Primary Examiner—John M Villecco
(74) Attorney, Agent, or Firm—Oblon, Spivak, McClelland, Maier & Neustadt, L.L.P.

(57) ABSTRACT

A signal processing apparatus for carrying out signal processing on an input image signal and to output the result includes first correction processing means for carrying out correction processing dependent on pixels on the input image signal, second correction processing means for carrying out correction processing independent from pixels on a supplied image signal, synchronization processing means for generating RGB signals that represent a captured image and has matching spatial phases based on a supplied image signal, conversion means for carrying out at least processing for generating a luminance signal and a color signal based on a supplied image signal, and first resolution conversion means for converting a captured image into an image having the same resolution as an output image. The first resolution conversion means is provided downstream of the first correction processing means and upstream of the conversion means.

2 Claims, 7 Drawing Sheets

Exemplary Art

Exemplary Art

SIGNAL PROCESSING APPARATUS ALLOWING AN INCREASE IN PIXELS WITHOUT AN INCREASE IN DRIVING FREQUENCY AND CIRCUIT AREA

CROSS REFERENCES TO RELATED APPLICATIONS

The present invention contains subject matter related to Japanese Patent Application JP 2005-372790 filed in the Japanese Patent Office on Dec. 26, 2005, the entire contents of which are incorporated herein by reference.

BACKGROUND OF THE INVENTION

1. Field of the Invention

The present invention relates to a signal processing apparatus and, more specifically, relates to a signal processing apparatus that can carry out appropriate compensation within a predetermined amount of time and prevent degradation of image quality even when the number of pixels in a solid-state image-pickup device is increased by neither increasing the driving frequency nor increasing the circuit area.

2. Description of the Related Art

Recently, for apparatuses for recording digital moving images (for example, single-chip digital video cameras) that use one solid-state image-pickup device or apparatuses for recording digital moving images (for example, triple-chip digital video cameras) that use a plurality of solid-state image-pickup devices, the number of pixels included in the solid-state image-pickup devices of such systems has been increasing.

Even under such increase in the number of pixels, in such moving-image capturing systems, their outputs conform to a television signal standard (for example, National Television System Committee (NTSC), Phase Alternation by Line (PAL), or SEquential Couleur A Memoire (SECAM)) and, thus, must be appropriately processed by compensating for the predetermined field frequency (or frame frequency), the horizontal resolution, and the vertical resolution, within a predetermined amount of time.

When the number of pixels obtained from the solid-state image-pickup device (resolution) is small, in general, such appropriate processing is carried out by a configuration shown in FIG. 1.

FIG. 1 is a block diagram illustrating an example of a signal processing system included in a known digital video camera.

As shown in FIG. 1, a signal-processing system 1 is basically constructed of a lens 11, a solid-state image-pickup device 12, an analog/digital (A/D) converter 13, and a camera-signal processing unit 14. The camera-signal processing unit 14 includes a correction processing unit 21 dependent on pixels (hereinafter, simply referred to as a correction processing unit 21), a correction processing unit 22 independent from pixels (hereinafter, simply referred to as an independent correction processing unit 22), a synchronization processing unit 23, a modulation and YC-conversion processing unit 24, and a resolution conversion processing unit 25.

The correction processing unit 21 dependent on pixels carries out correction for a digital video camera using the solid-state image-pickup device 12 while taking into consideration defective pixels, among the pixels in the correction processing unit 21, that output signals at an abnormal level even when light is not incident thereon. As a result, when the quality of a captured image is degraded, the correction processing unit 21 dependent on pixels checks which pixels of the solid-state image-pickup device 12 are defective, and the defective pixels determined as a result of the checkout are corrected.

The lens 11 focuses light L1 from an object on the solid-state image-pickup device 12 as light L2.

The solid-state image-pickup device 12 is constituted of a charge-coupled device (CCD) or a complementary metal oxide semiconductor (CMOS), carries out photoelectric conversion by receiving light L1 (light L2) that is from the object and is incident thereon via the lens 11, and outputs an analog image signal E1 that is an electrical signal corresponding to the amount of received light to the A/C converter 13. On the surface of the solid-state image-pickup device 12, red (R), green (G), and blue (B) on-chip color filters (OCCFs) are provided for each light-receiving element constituting each pixel. Only transmissive color components of the OCCFs among the focused light L2 are photoelectrically converted for each pixel.

The A/D converter 13 converts the analog signal E1 supplied from the solid-state image-pickup device 12 and outputs a digital signal S1 to the camera-signal processing unit 14 (correction processing unit 21).

The correction processing unit 21 of the camera-signal processing unit 14 carries out correction processing dependent on the pixels, such as pixel defect compensation processing (Japanese Unexamined Patent Application Publication No. 5-344426 (hereinafter referred to as Patent Document 1)), channel difference adjustment gain processing (Japanese Unexamined Patent Application Publication No. 2002-252808 (hereinafter referred to as Patent Document 2)), and noise reduction processing for pixel units (Japanese Unexamined Patent Application Publication No. 2005-311455 (hereinafter referred to as Patent Document 3)), on the digital signal S1 and outputs the obtained signal S2 to an independent correction processing unit 22.

Patent Document 1 discloses a technology employed by a video camera that is capable of selectively switching between a field readout mode and a frame readout mode in which, when a mode for detecting defective pixels is selected, the readout mode of the image-pickup device is compulsorily changed to a frame readout mode.

Patent Document 2 discloses an apparatus including a CCD image sensor that reads out, line by line, pixel information corresponding to one screen and outputs the pixel information, read out line by line, by separating the information into two channels, i.e., left and right channels. In this apparatus, the black level of the pixel data read out from the CCD image sensor is detected independently for the left and right channels, and the black level is corrected for each channel.

Patent Document 3 discloses a technology for carrying out secondary differentiation after carrying out smoothing and interpolation between a target pixel on which noise reduction is carried out and a peripheral pixel in the periphery of the target pixel, comparing the result of the secondary differentiation with a threshold value, determining whether or not the peripheral pixel is a pixel that can be used for noise reduction, and carrying out noise reduction with a pixel that is determined to be able to be used for noise reduction.

Returning to FIG. 1, the independent correction processing unit 22 carries out processing, such as digital gain processing for applying a uniform gain to all colors in the plane and white balance gain processing for independently applying a gain to each color in the plane in a uniform manner, on the signal S2 supplied from the correction processing unit 21 and outputs the obtained signal S3 to the synchronization processing unit 23.

The synchronization processing unit 23 generates signals R, G, and B having matching spatial phases for each pixel on the basis of the signal S3, and outputs the generated signals R, G, and B to the modulation and YC-conversion processing unit 24. When the signal-processing system 1 is a single-chip system, the spatial sampling point for the signal S3 differs for each color. Therefore, synchronization processing (processing for matching the spatial phases) dependent on the OCCF positional pattern of the solid-state image-pickup device 12 is carried out at the synchronization processing unit 23.

The modulation and YC-conversion processing unit 24 carries out image-quality improvement processing, 1/γ processing, Y-signal generation processing, C-signal generation processing, and so on on the R, G, and B signals supplied from the synchronization processing unit 23 and outputs the obtained video signals Y1 and C1 to the resolution conversion processing unit 25.

The resolution-conversion processing unit 25 carries out processing to convert the video signal Y1 and C1 supplied from the modulation and YC-conversion processing unit 24 into signals conforming to the output format and outputs the obtained video signals Y2 and C2 to an external unit. At the resolution-conversion processing unit 25, processing including, for example, interlace processing and cutout processing of effective image regions (for example, processing to cut out and output only valid regions, not including a margin provided for blurriness correction processing) is carried out as conversion processing conforming to the output format.

The signals output from the resolution-conversion processing unit 25 are used as a signal for recording a moving image or a signal for displaying an image being captured at a processing unit (not shown) that is provided in the subsequent section.

FIG. 2 is a block diagram illustrating an example of another configuration of the known signal-processing unit 1. Components that are the same as those illustrated in FIG. 1 are indicated by the same reference numbers and descriptions thereof are not repeated.

In the signal-processing unit 1 illustrated in FIG. 2, the processing carried out by the correction processing unit 21 illustrated in FIG. 1 is carried out in parallel by a correction processing unit 21-1 and a correction processing unit 21-2, and the processing carried out by the independent correction processing unit 22 illustrated in FIG. 1 is carried out in parallel by an independent correction processing unit 22-1 and an independent correction processing unit 22-2.

Similarly, the processing carried out by the synchronization processing unit 23 illustrated in FIG. 1 is carried out in parallel by a synchronization processing unit 23-1 and a synchronization processing unit 23-2, and the processing carried out by the modulation and YC-conversion processing unit 24 illustrated in FIG. 1 is carried out in parallel by a modulation and YC-conversion processing unit 24-1 and a modulation and YC-conversion processing unit 24-2.

The A/D converter 13 shown in FIG. 2 converts an analog signal E1 supplied from a solid-state image-pickup device 12 into a digital signal, splits the digital signal obtained after the conversion into a digital signal S1-1 and a digital signal S1-2, and outputs the digital signal S1-1 to the correction processing unit 21-1 and the digital signal S1-2 to the correction processing unit 21-2.

The resolution-conversion processing unit 25 illustrated in FIG. 2 carries out processing to convert the video signal Y1-1 and C1-1 supplied from the modulation and YC-conversion processing unit 24-1 and the video signal Y1-2 and C1-2 supplied from the modulation and YC-conversion processing unit 24-2 into signals conforming to the output format and outputs the obtained video signals Y2 and C2 to an external unit.

In the signal processing system 1 illustrated in FIG. 2, the signal S2-1 that is obtained by carrying out processing at the correction processing unit 21-1 is supplied to the independent correction processing unit 22-1, whereas the signal S2-2 that is obtained by carrying out processing at the correction processing unit 21-2 is supplied to the independent correction processing unit 22-2. A combined signal of the signal S2-1 and the signal S2-2 corresponds to the signal S2 illustrated in FIG. 1.

The signal S3-1 that is obtained by carrying out processing at the independent correction processing unit 22-1 is supplied to the synchronization processing unit 23-1, whereas the signal S3-2 that is obtained by carrying out processing at the independent correction processing unit 22-2 is supplied to the synchronization processing unit 23-2. A combined signal of the signal S3-1 and the signal S3-2 corresponds to the signal S3 illustrated in FIG. 1.

Similarly, the R, G, and B signals that are obtained by carrying out processing at the synchronization processing unit 23-1 are supplied to the modulation and YC-conversion processing unit 24-1, whereas the R, G, and B signals that are obtained by carrying out processing at the synchronization processing unit 23-2 are supplied to the modulation and YC-conversion processing unit 24-2. Combined signals of the R, G, and B signals that are obtained by carrying out processing at the synchronization processing unit 23-1 and the R, G, and B signals that are obtained by carrying out processing at the synchronization processing unit 23-2 correspond to the R, G, and B signals illustrated in FIG. 1.

The video signals Y1-1 and C1-1 that are obtained by carrying out processing at the modulation and YC-conversion processing unit 24-1 are supplied to the resolution-conversion processing unit 25, and the video signals Y1-2 and C1-2 that are obtained by carrying out processing at the modulation and YC-conversion processing unit 24-2 are supplied to the resolution-conversion processing unit 25. Combined video signals of the video signals Y1-1 and C1-1 and the video signals Y1-2 and C1-2 correspond to the video signals Y1 and C1 illustrated in FIG. 1.

In this way, by carrying out processing that is carried out at one configuration at a plurality of configurations in parallel, an increase in the driving frequency that is a reference of the operation of the camera-signal processing unit 14 can be prevented.

As shown in FIGS. 1 and 2, in the known signal processing system 1, conversion processing conforming to the output format is carried out as the last step in the process.

SUMMARY OF THE INVENTION

In this way, when a configuration in which conversion processing conforming to an output format is carried out at the last step of the process is employed, the driving frequency of the system increases as the number of pixels included in a solid-state image-pickup device 12 increases. Thus, there is a problem in that electricity consumption increases. When the amount of data to be processed increases due to the increase in the number of pixels in the solid-state image-pickup device 12, the driving frequency must be increased to compensate for the processing when the same configuration is employed.

When a configuration for carrying out parallel processing, such as that shown in FIG. 2, is employed to reduce the driving frequency, two sets of the same configuration is required. Thus, there is a problem in that the scale of the circuit has to be increased, and thus, the circuit area increases.

To reduce the driving frequency of the camera-signal processing unit 14, addition readout processing may be carried out at the solid-state image-pickup device 12 so as to decrease the substantial number of input pixels. In such a case, however, there are problems in that degradation of resolution due to addition and degradation in image quality caused by the pixel units of the solid-state image-pickup device 12 cannot be compensated for.

The present invention has been conceived in light of the problems described above. Accordingly, even when the number of pixel in a solid-state image-pickup device 12 is increased, appropriate processing is compensated for within a predetermined amount of time without causing an increase in driving frequency and an increase in circuit area, and degradation in image quality is prevented.

An aspect of the present invention provides a signal processing apparatus configured to carry out signal processing on an input image signal and to output the result of the signal processing including a first correction processing unit configured to carry out correction processing dependent on pixels of an image-pickup device that is an output source of the image signal on the input image signal, a second correction processing unit configured to carry out correction processing independent from pixels of the image-pickup device on a supplied image signal, a synchronization processing unit configured to generate RGB signals that represents a captured image and has matching spatial phases on the basis of a supplied image signal, a conversion unit configured to carry out at least processing for generating a luminance signal and a color signal on the basis of a supplied image signal, and a first resolution conversion unit configured to convert a captured image into an image having a resolution that is the same as the resolution of an image to be output, wherein the first resolution conversion unit is provided downstream of the position of the first correction processing unit and upstream of the position of the conversion unit.

The first signal processing apparatus may include a second resolution conversion unit configured to carry out at least one of processing for cutting out an image in a range of effective pixels and processing for converting a progressive image signal into an interlace image signal.

According to another aspect of the present invention, a resolution conversion unit configured to convert a captured image into an image having a resolution that is the same as the resolution of an image to be output is provided downstream of the position where a correction processing unit configured to carry out correction processing dependent on pixels of an image-pickup device that is an output source of the image signal on the input image signal and upstream of a conversion unit configured to carry out at least processing for generating a luminance signal and a color signal on the basis of a supplied image signal.

According to another aspect of the present invention, appropriate compensation can be carried out within a predetermined amount of time and degradation of image quality can be prevented even when the number of pixels in a solid-state image-pickup device is increased by neither increasing the driving frequency nor increasing the circuit area.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification and the accompanying drawings. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Figure 3:
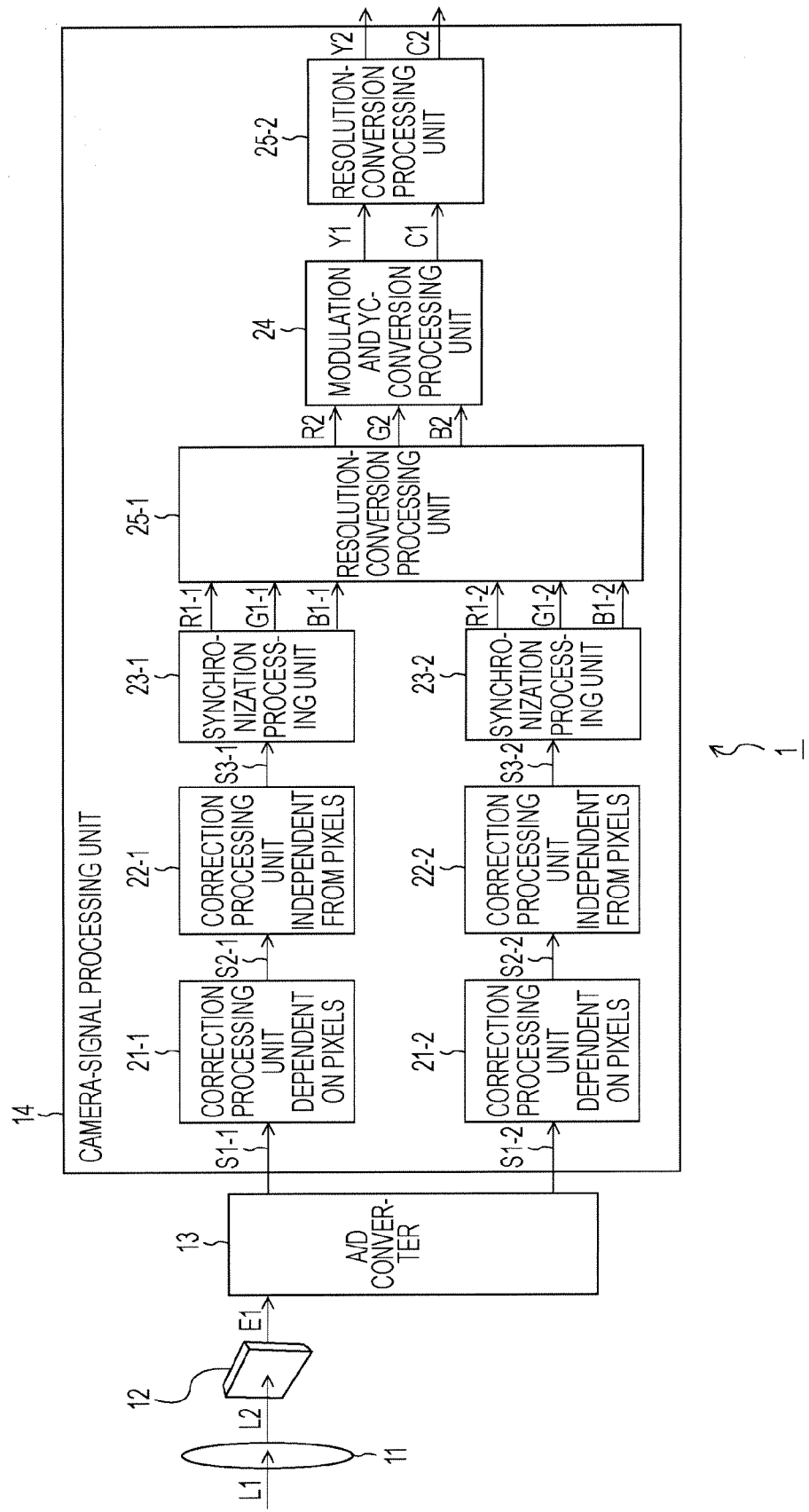
FIG. 3 is a block diagram of a configuration of a signal processing system included in the entire configuration of a digital video came according to an embodiment of the present invention.

An embodiment of the present invention provides a signal processing apparatus (for example a signal processing apparatus shown in FIG. 3) configured to carry out signal processing on an input image signal and to output the result of the signal processing including first correction processing means (for example, correction processing units 21-1 and 21-2) for carrying out correction processing dependent on pixels of an image-pickup device that is the output source of the image signal on the input image signal, second correction processing means (for example, independent correction processing units 22-1 and 22-2 shown in 3) for carrying out correction processing independent from pixels of the image-pickup device on a supplied image signal, synchronization processing means (for example, synchronization processing units 23-1 and 23-1) for generating RGB signals that represents a captured image and has matching spatial phases on the basis of a supplied image signal, conversion means (for example, a modulation and YC-conversion processing unit 24 shown in FIG. 3) for carrying out at least processing for generating a luminance signal and a color signal on the basis of a supplied image signal, and first resolution conversion means (for example, a resolution-conversion processing unit 25-1 shown in FIG. 3) for converting a captured image into an image having a resolution that is the same as the resolution of an image to be output, wherein the first resolution conversion means is provided downstream of the position of the first correction processing means and upstream of the position of the conversion means.

The signal processing apparatus may further include second resolution conversion means (for example, a resolution-conversion processing unit 25-2 shown in FIG. 3) for carrying out at least one of processing for cutting out an image in a range of effective pixels and processing for converting a progressive image signal into an interlace image signal.

Embodiments of the present invention will be described below with reference to the drawings.

Figure 1:
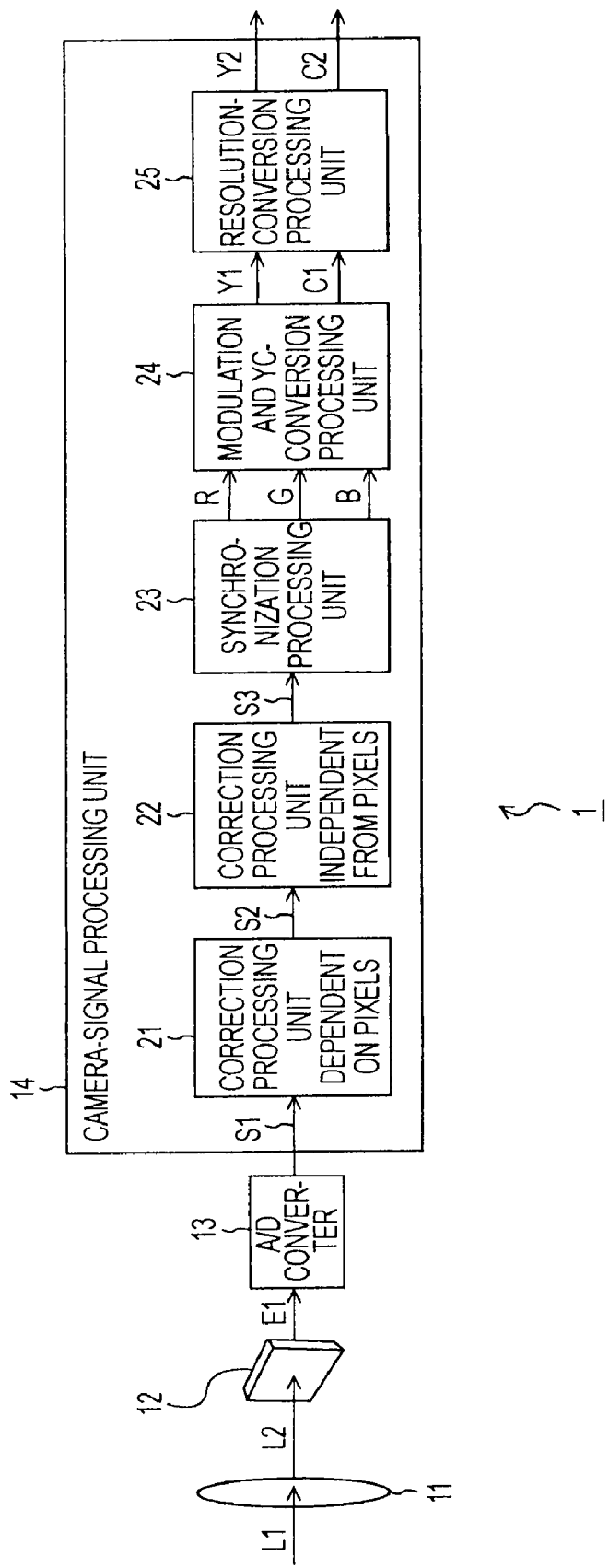
FIG. 1 is a block diagram of an example configuration of a signal processing system included in the entire configuration of a known digital video came.
Figure 2:
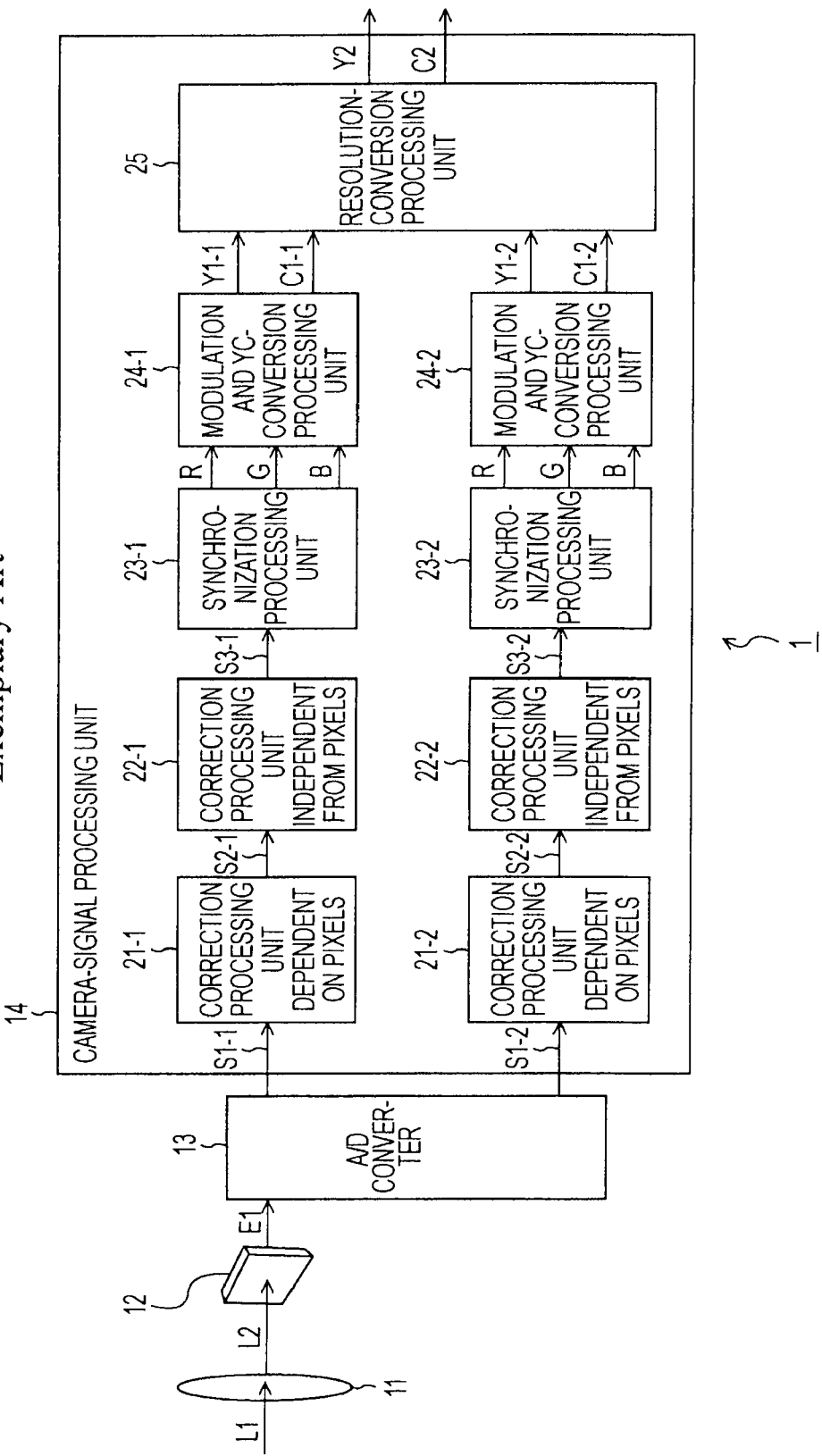
FIG. 2 is a block diagram of another example configuration of a known signal processing system.

FIG. 3 is a block diagram illustrating a signal processing system of the entire configuration of a digital video camera according to an embodiment of the present invention. Components corresponding to the configurations illustrated in FIGS. 1 and 2 are represented by the same reference numerals.

The series of signal processing is carried out in parallel by a signal processing system 1 of FIG. 3 until the R, G, and B signals are synchronized.

More specifically, an A/D converter 13 in FIG. 3 converts an analog signal E1 supplied from a solid-state image-pickup device 12 into a digital signal, splits the digital signal obtained after the conversion into a digital signal S1-1 and a digital signal S1-2, and outputs the digital signal S1-1 to a correction processing unit 21-1 and the digital signal S1-2 to a correction processing unit 21-2.

The correction processing unit 21-1 of a camera-signal processing unit 14 carries out correction processing dependent on pixels, such as pixel defect compensation processing (Patent Document 1), channel difference adjustment gain processing (Patent Document 2), and noise reduction processing for pixel units (Patent Document 3), on the digital signal S1-1 and outputs the obtained signal S2-1 to an independent correction processing unit 22-1.

The independent correction processing unit 22-1 carries out processing, including digital gain processing for applying a uniform gain to all colors in the plane and white balance gain processing for independently applying a gain to each color in the plane in a uniform manner, on the signal S2-1 supplied from the correction processing unit 21-1 and outputs the obtained signal S3-1 to a synchronization processing unit 23-1.

The synchronization processing unit 23-1 generates signals R1-1, G1-1, and B1-1, having matching spatial phases for each pixel, on the basis of the signal S3-1 and outputs the generated signals R1-1, G1-1, and B1-1 to a resolution-conversion processing unit 25-1. When the signal-processing system 1 is a single-chip system, the spatial sampling point for the signal S3-1 differs for each color. Therefore, synchronization processing (processing for matching the spatial phases) dependent on the OCCF positional pattern of the solid-state image-pickup device 12 is carried out at the synchronization processing unit 23-1.

Similar to the correction processing unit 21-1, the correction processing unit 21-2 carries out correction processing dependent on pixels, such as pixel defect compensation processing (Patent Document 1), channel difference adjustment gain processing (Patent Document 2), and noise reduction processing for pixel units (Patent Document 3), on the digital signal S1-2 and outputs the obtained signal S2-2 to an independent correction processing unit 22-2.

The independent correction processing unit 22-2 carries out processing, including digital gain processing for applying a uniform gain to all colors in the plane and white balance gain processing for independently applying a gain to each color in the plane in a uniform manner, on the signal S2-2 supplied from the correction processing unit 21-2 and outputs the obtained signal S3-2 to a synchronization processing unit 23-2.

The synchronization processing unit 23-2 generates signals R1-2, G1-2, and B1-2, having matching spatial phases for each pixel, on the basis of the signal S3-2 and outputs the generated signals R1-2, G1-2, and B1-2 to the resolution-conversion processing unit 25-1.

The resolution-conversion processing unit 25-1 carries out conversion processing (for example, reduction operation) on the signals R1-1, G1-1, and B1-1 supplied from the synchronization processing unit 23-1 and the signals R1-2, G1-2, and B1-2 supplied from the synchronization processing unit 23-2 so as to convert an image represented by these signals into an image having the same resolution as that of an image of the output format and outputs the obtained signals R2, G2, and B2 to a modulation and YC-conversion processing unit 24.

The modulation and YC-conversion processing unit 24 carries out image-quality improvement processing, 1/γ processing, Y-signal generation processing, C-signal generation processing, and so on on the R2, G2, and B2 signals supplied from the resolution-conversion processing unit 25-1 and outputs the obtained video signals Y1 and C1 to a resolution-conversion processing unit 25-2.

The resolution-conversion processing unit 25-2 carries out processing to convert the video signals Y1 and C1 supplied from the modulation and YC-conversion processing unit 24 into signals conforming to the output format and outputs the obtained video signals Y2 and C2 to an external unit. At the resolution-conversion processing unit 25-2, processing including, for example, interlace processing and cutout processing of effective image regions (for example, processing to cut out and output only valid regions, not including a margin provided for blurriness correction processing) is carried out as conversion processing conforming to the output format.

The signals output from resolution-conversion processing unit 25-2 are used at a processing unit (not shown) provided in the subsequent section as signals for recording a moving image or signals for displaying an image being captured.

In this way, by providing the configuration for carrying out resolution conversion processing (i.e., the resolution-conversion processing unit 25-1 in FIG. 3) that is included in the processing (resolution conversion processing, interlace processing, and cutout processing of effective image regions) carried out by the resolution-conversion processing unit 25 illustrated in FIGS. 1 and 2 at a position upstream of the configuration for carrying out the image-quality improvement processing, 1/γ processing, Y-signal generation processing, and C-signal generation processing (i.e., the modulation and YC-conversion processing unit 24), two configurations for the image-quality improvement processing, 1/γ processing, Y-signal generation processing, and C-signal generation processing are not required, as shown in FIG. 2, even when the processing processes are carried out in parallel.

Even when the number of pixels is increased in the solid-state image-pickup device 12, the amount of data to be processed by resolution reduction processing can be reduced in an early stage in the series of processes. Therefore, by carrying out part of the series of processes in parallel, an increase in the driving frequency can be suppressed, and an increase in the circuit area can be suppressed. Furthermore, since processing can be appropriately compensated for within a predetermined amount time and since addition of pixel values is not carried out at the solid-state image-pickup device 12, it is possible to prevent the image quality from being degraded.

Figure 4:
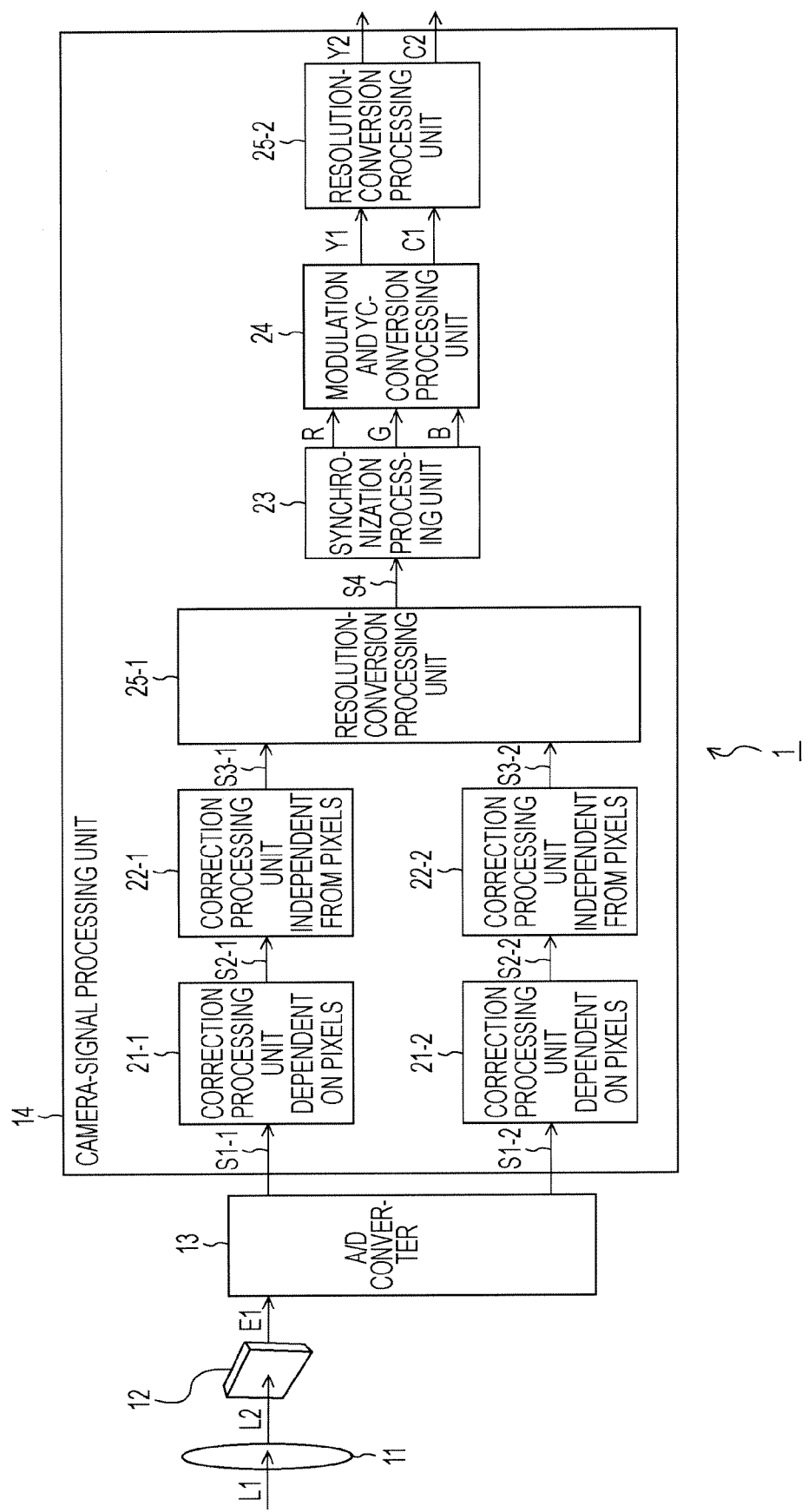
FIG. 4 is a block diagram of a signal processing system according to another embodiment of the present invention.

FIG. 4 is a block diagram illustrating another embodiment of the signal-processing system 1. The components in this configuration corresponding to the components in the above-described configuration are represented by the same reference numerals.

In the signal-processing system 1 in FIG. 4, the series of signal processing processes are carried out in parallel until the process of the correction system is carried out.

More specifically, an A/D converter 13, correction processing units 21-1 and 21-2, and independent correction processing units 22-1 and 22-2 shown in FIG. 4 are the same as the A/D converter 13, the correction processing units 21-1 and 21-2, and the independent correction processing units 22-1 and 22-2, all shown in FIG. 3.

The A/D converter 13 shown in FIG. 4 converts an analog signal E1 supplied from a solid-state image-pickup device 12 into a digital signal, splits the digital signal obtained after the conversion into a digital signal S1-1 and a digital signal S1-2, and outputs the digital signal S1-1 to a correction processing unit 21-1 and the digital signal S1-2 to a correction processing unit 21-2.

The correction processing unit 21-1 carries out correction processing dependent on pixels on the digital signal S1-1 and outputs the obtained signal S2-1 to an independent correction processing unit 22-1. The independent correction processing unit 22-1 carries out digital gain processing, white balance gain processing, and so on on the signal S2-1 supplied from the correction processing unit 21-1 and outputs the obtained signal S3-1 to a resolution-conversion processing unit 25-1.

The correction processing unit 21-2 carries out correction processing dependent on pixels on the digital signal S1-2 and outputs the obtained signal S2-2 to an independent correction processing unit 22-2. The independent correction processing unit 22-2 carries out digital gain processing, white balance gain processing, and so on on the signal S2-2 supplied from the correction processing unit 21-2 and outputs the obtained signal S3-2 to the resolution-conversion processing unit 25-1.

The resolution-conversion processing unit 25-1 carries out conversion processing (for example, reduction operation) on the signal S3-1 supplied from the independent correction processing unit 22-1 and the signal S3-2 supplied from the independent correction processing unit 22-2 so as to convert an image represented by these signals into an image having the same resolution as that of an image of the output format and outputs the obtained signal S4 to a synchronization processing unit 23.

As shown in FIG. 4, the signal S3-1 output from the independent correction processing unit 22-1 and the signal S3-2 output from the independent correction processing unit 22-2 represent the results of processing by the correction system of the entire image captured by the solid-state image-pickup device 12, whereas the signal S4 output from the resolution-conversion processing unit 25-1 represents the results of processing by the correction system of, for example, a reduced image of the entire image captured by the solid-state image-pickup device 12.

The synchronization processing unit 23 generates R, G, and B signals having matching spatial phases for each pixel on the basis of the signal S4 supplied from the resolution-conversion processing unit 25-1 and outputs the generated R, G, and B signals to the modulation and YC-conversion processing unit 24.

The modulation and YC-conversion processing unit 24 carries out image-quality improvement processing, 1/γ processing, Y-signal generation processing, C-signal generation processing, and so on on the R, G, and B signals supplied from the synchronization processing unit 23 and outputs the obtained video signals Y1 and C1 to a resolution-conversion processing unit 25-2.

The resolution-conversion processing unit 25-2 carries out processing to convert the video signal Y1 and C1 supplied from the modulation and YC-conversion processing unit 24 into signals conforming to the output format and outputs the obtained video signals Y2 and C2 to an external unit. At the resolution-conversion processing unit 25-2, processing including, for example, interlace processing and cutout processing of effective image regions is carried out as conversion processing conforming to the output format.

In this way, by providing the configuration for carrying out resolution conversion processing (i.e., the resolution-conversion processing unit 25-1 in FIG. 4) that is included in the processing (resolution conversion processing, interlace processing, and cutout processing of effective image regions) carried out by the resolution-conversion processing unit 25 illustrated in FIGS. 1 and 2 at a position upstream of the configuration for carrying out the synchronization processing (i.e., the synchronization processing unit 23), two configurations for the synchronization processing are not required, as shown in FIG. 2.

Similar to the configuration illustrated in FIG. 3, the configuration illustrated in FIG. 4 enables the amount of data to be processed by resolution reduction processing to be reduced in an early stage in the series of processes. Therefore, an increase in the driving frequency can be suppressed, and also an increase in the circuit area can be suppressed. Furthermore, since processing can be appropriately compensated for within a predetermined amount time, it is possible to prevent the image quality from being degraded.

Figure 5:
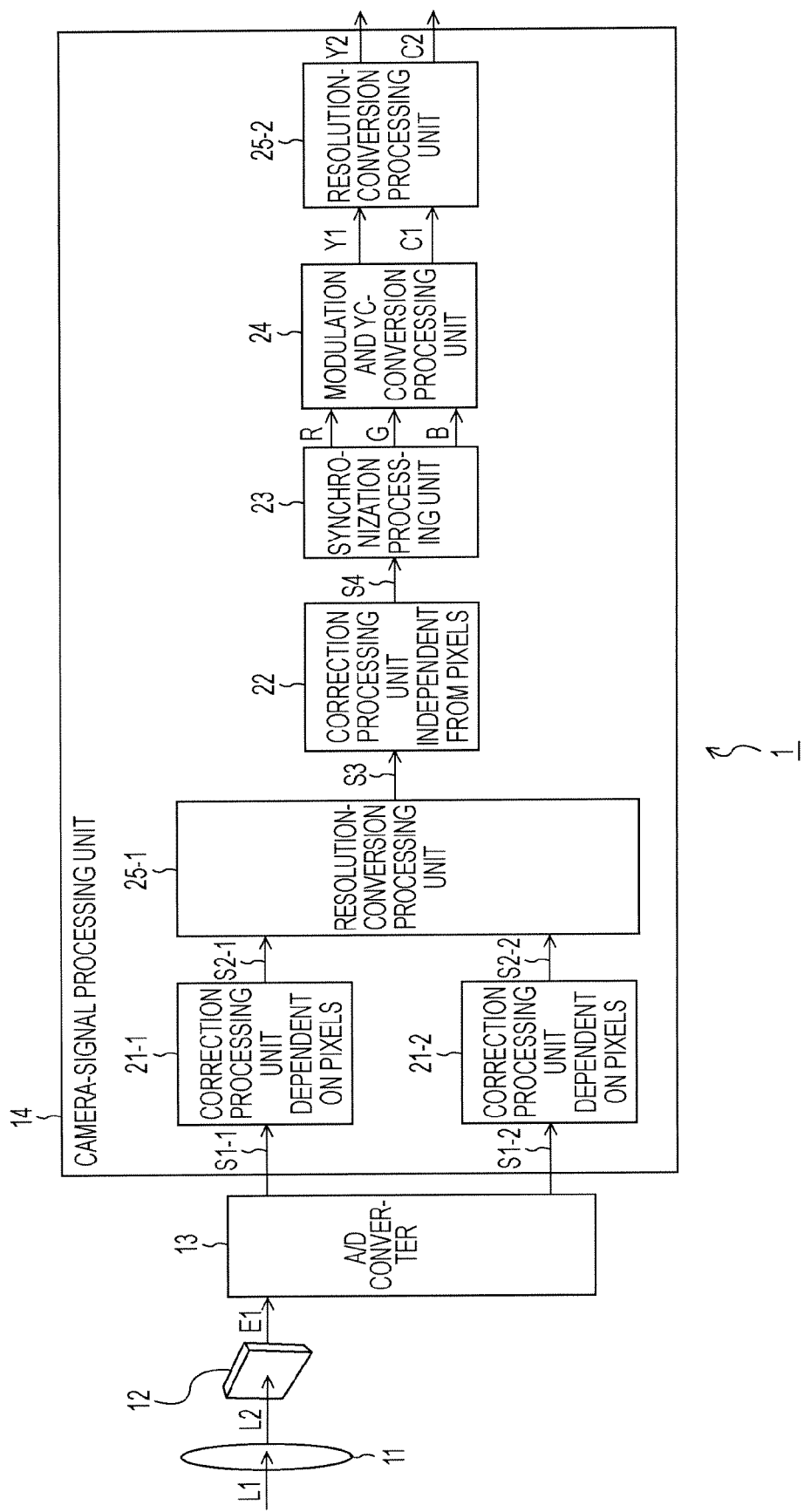
FIG. 5 is a block diagram of a signal processing system according to another embodiment of the present invention.

FIG. 5 is a block diagram illustrating another embodiment of the signal-processing system 1. Components corresponding to the above-described configurations are represented by the same reference numerals.

In the signal-processing system 1 shown in FIG. 5, the series of signal processing is carried out in parallel until correction processing dependent on pixels that is one of the two processes carried out by the correction system is carried out.

More specifically, an A/D converter 13 and a correction processing units 21-1 and 21-2 shown in FIG. 5 are the same as the A/D converter 13 and the correction processing units 21-1 and 21-2 shown in FIGS. 3 and 4.

The A/D converter 13 shown in FIG. 5 converts an analog signal E1 supplied from a solid-state image-pickup device 12 into a digital signal, splits the digital signal obtained after the conversion into a digital signal S1-1 and a digital signal S1-2 and outputs the digital signal S1-1 to a correction processing unit 21-1 and the digital signal S1-2 to a correction processing unit 21-2.

The correction processing unit 21-1 carries out correction processing dependent on pixels on the digital signal S1-1 and outputs the obtained signal S2-1 to a resolution-conversion processing unit 25-1. The correction processing unit 21-2 carries out processing that is dependent on pixels on the signal S1-2 and outputs the obtained signal S2-2 to the resolution-conversion processing unit 25-1.

The resolution-conversion processing unit 25-1 carries out conversion processing (for example, reduction operation) on the signal S2-1 supplied from the correction processing unit 21-1 and the signal S2-2 supplied from the correction processing unit 21-2 so as to convert an image represented by these signals into an image having the same resolution as that of an image of the output format and outputs the obtained signal S3 to an independent correction processing unit 22.

The configuration downstream of the independent correction processing unit 22 is the same as the configuration illustrated in FIG. 1. More specifically, the independent correction processing unit 22 carries out digital gain processing, white balance gain processing, and so on on the signal S3 supplied from the resolution-conversion processing unit 25-1 and outputs the obtained signal S4 to a synchronization processing unit 23.

The modulation and YC-conversion processing unit 24 carries out image-quality improvement processing, 1/γ processing, Y-signal generation processing, C-signal generation processing, and so on on the R, G, and B signals supplied from the synchronization processing unit 23 and outputs the obtained video signals Y1 and C1 to a resolution-conversion processing unit 25-2.

The resolution-conversion processing unit 25-2 carries out processing to convert the video signal Y1 and C1 supplied from the modulation and YC-conversion processing unit 24 into signals conforming to the output format and outputs the obtained video signals Y2 and C2 to an external unit. At the resolution-conversion processing unit 25, processing including, for example, interlace processing and cutout processing of effective image regions is carried out as conversion processing conforming to the output format.

In this way, by providing the configuration for carrying out resolution conversion processing (i.e., the resolution-conversion processing unit 25-1 in FIG. 5) that is included in the processing (resolution conversion processing, interlace processing, and cutout processing of effective image regions) carried out by the resolution-conversion processing unit 25 illustrated in FIGS. 1 and 2 at a position upstream of the configuration for carrying out the correction processing independent from pixels (i.e., the independent correction processing unit 22), two configurations for the correction processing are not required, as shown in FIG. 2.

Similar to the configurations illustrated in FIGS. 3 and 4, the configuration illustrated in FIG. 5 enables the amount of data to be processed by resolution reduction processing can be reduced in an early stage in the series of processes. Therefore, an increase in the driving frequency can be suppressed, and an increase in the circuit area can be suppressed. Furthermore, since processing can be appropriately compensated for within a predetermined amount time, it is possible to prevent the image quality from being degraded.

In this way, by providing the configuration for carrying out resolution conversion processing (i.e., the resolution-conversion processing unit 25-1 in FIGS. 3, 4, and 5) that is included in the processing (resolution conversion processing, interlace processing, and cutout processing of effective image regions) carried out by the resolution-conversion processing unit 25 illustrated in FIGS. 1 and 2 at a more upstream position (a position downstream to the configuration for carrying out correction dependent on pixels), a plurality of configurations do not have to be provided downstream thereof as shown in FIG. 2.

As described above, in the signal-processing system 1 in which the resolution-conversion processing unit is provided as two processing units, the transition in the resolution of the image obtained by the processing carried out by the units depend on the positions and the functions of the units.

Figure 6:
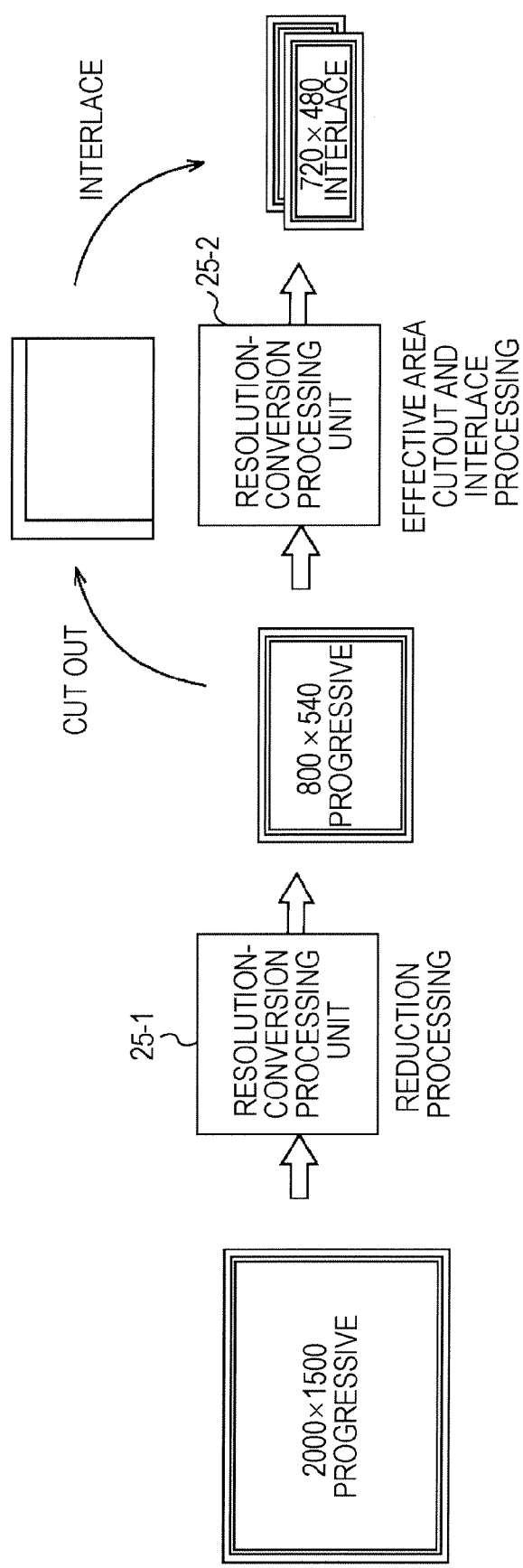
FIG. 6 illustrates an example of the transition of resolution in an image.

FIG. 6 illustrates the transition in the resolution of an image.

For example, as shown in the left end of FIG. 6, for an image (i.e., progressive image) read out from the solid-state image-pickup device 12 on the basis of a progressive method, reduction processing is carried out on the progressive image at the resolution-conversion processing unit 25-1, which is the first resolution-conversion processing unit, so as to suppress the driving frequency of the subsequent configurations.

Cutout processing conforming to the size of the output format (for example, the effective area excepting the cutout margin for blurriness correction) and interlace processing are carried out on the progressive image obtained by the reduction processing at the subsequent resolution-conversion processing unit 25-2. An image that is obtained by carrying out the processing is output.

In the example illustrated in FIG. 6, the size of the progressive image read out from the solid-state image-pickup device 12 is 2,000×1,500 pixels, whereas the size of the progressive image obtained after the resolution-conversion processing unit 25-1 carries out reduction processing is 800×540 pixels. The size of the interlace image obtained after cutout processing is carried out at the resolution-conversion processing unit 25-2 is 720×480 pixels.

Figure 7:
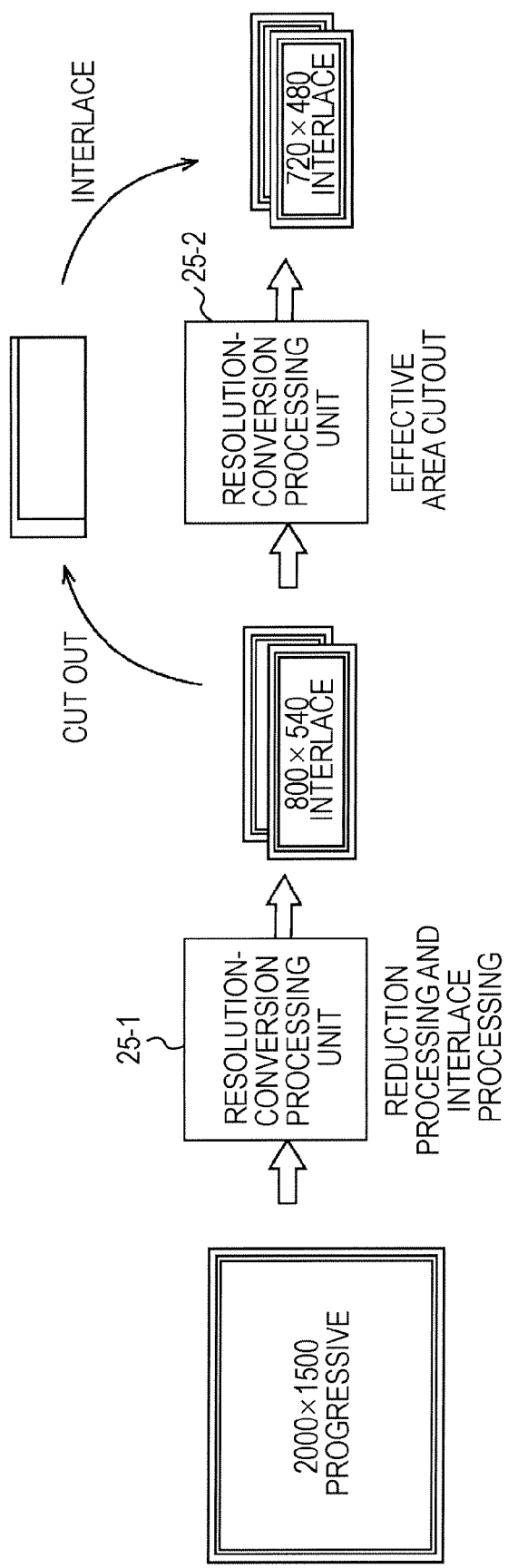
FIG. 7 illustrates another example of the transition of resolution in an image.

FIG. 7 illustrates another example of the transition of the resolution of an image.

For example, as shown in the left end of FIG. 7, for a progressive image read out from the solid-state image-pickup device 12 on the basis of a progressive method, reduction processing is carried out on the progressive image at the resolution-conversion processing unit 25-1, which is the first resolution-conversion processing unit, so as to suppress the driving frequency of the subsequent configurations.

In the example of FIG. 7, not only reduction processing but also interlace processing is carried out at the resolution-conversion processing unit 25-1. In this way, the content of the processing to be carried out by (i.e., the function provided to) the two resolution-conversion processing units may be suitably changed.

For the interlace image obtained by the reduction processing and the interlace processing, cutout processing for a size conforming to the output format is carried out at the resolution-conversion processing unit 25-2, which is the subsequent resolution-conversion processing unit, and the image obtained by the process is output.

In the example illustrated in FIG. 7, the size of the progressive image read out from the solid-state image-pickup device 12 is 2,000×1,500 pixels, whereas the size of the interlace image obtained after the resolution-conversion processing unit 25-1 carries out reduction processing and interlace processing is 800×540 pixels. The size of the interlace image obtained after cutout processing is carried out at the resolution-conversion processing unit 25-2 is 720×480 pixels.

In the above, a case in which a camera-signal processing unit 14, such as that illustrated in FIGS. 3 to 5, is provided in a digital video camera has been described. However, the camera-signal processing unit 14 may be employed by any image-pickup apparatus that has a function of capturing moving images and still images.

By configuring the resolution-conversion processing unit 25-1 in the signal-processing system 1 illustrated in FIG. 5 to carried out the interlace processing and the cutout processing of an effective image region that are carried out at the resolution-conversion processing unit 25-2, the resolution-conversion processing unit 25-2 does not have to be provided downstream of the modulation and YC-conversion processing unit 24. Thus, an increase in the circuit area can be suppressed.

It should be understood by those skilled in the art that various modifications, combinations, sub-combinations and alterations may occur dependent on design requirements and other factors insofar as they are within the scope of the appended claims or the equivalents thereof.

What is claimed is:

1. A signal processing apparatus configured to carry out signal processing on an input image signal and to output the result of the signal processing, the apparatus comprising:

first correction processing means for carrying out correction processing dependent on pixels of an image-pickup device on the input image signal, the image-pickup device being the output source of the image signal;

second correction processing means for carrying out correction processing independent from pixels of the image-pickup device on a supplied image signal;

synchronization processing means for generating RGB signals on the basis of a supplied image signal, the RGB signals representing a captured image and having matching spatial phases;

conversion means for carrying out at least processing for generating a luminance signal and a color signal on the basis of a supplied image signal; and first resolution conversion means for reducing resolution of a captured image, wherein the first correction processing means, the second correction processing means, the synchronization processing means, the conversion means, and the first resolution conversion means are all provided downstream of the position of an analog-to-digital converter, and the first resolution conversion means is provided downstream of the position of the first correction processing means and upstream of the position of the conversion means.

2. The signal processing apparatus according to claim 1, further comprising:

second resolution conversion means for carrying out at least one of processing for cutting out an image in a range of effective pixels and processing for converting a progressive image signal into an interlace image signal.

* * * * *